United States Patent [19]

Heimann et al.

[11] Patent Number: 4,825,737

[45] Date of Patent: May 2, 1989

[54] LIFTING MECHANISM ESPECIALLY FOR A WHEEL SET IN A TRUING MACHINE

[75] Inventors: Alfred Heimann, Aachen; Herbert Ligacz, Wegberg, both of Fed. Rep. of Germany

[73] Assignee: Wilhelm Hegenscheidt Gesellschaft mbH, 5140 Erkelenz, Fed. Rep. of Germany

[21] Appl. No.: 63,175

[22] Filed: Jun. 15, 1987

[30] Foreign Application Priority Data

Jun. 26, 1986 [DE] Fed. Rep. of Germany ... 8617014[U]

[51] Int. Cl.$^4$ ............................................. B23B 13/00
[52] U.S. Cl. ...................................... 82/124; 82/105; 82/901
[58] Field of Search .................. 82/2.5, 4 E, DIGS. 2, 82/4 R, 4 A, 4 B, 4 C, 4 D, 2 R; 51/179, 215 CP, 279

[56] References Cited

U.S. PATENT DOCUMENTS

| | | | |
|---|---|---|---|
| 2,217,973 | 10/1940 | Snader | 82/DIG. 2 |
| 2,352,726 | 7/1944 | Maulding | 82/2.5 |
| 4,116,094 | 9/1978 | Dombowski | 82/2.5 |
| 4,347,769 | 9/1982 | Dombrowski | 82/4 E |

FOREIGN PATENT DOCUMENTS

| | | | |
|---|---|---|---|
| 1141156 | 10/1959 | Fed. Rep. of Germany | 82/4.5 |
| 1087429 | 8/1960 | Fed. Rep. of Germany | . |
| 2621050 | 11/1977 | Fed. Rep. of Germany | . |

*Primary Examiner*—Frederick R. Schmidt
*Assistant Examiner*—Blynn Shideler
*Attorney, Agent, or Firm*—W. G. Fasse; D. H. Kane

[57] ABSTRACT

A mechanism for lifting a wheel set, such as a railroad wheel set, is constructed for cooperation especially with wheel truing machines for lifting a wheel set into a machining position or out of the machining position. In order to facilitate the chip removal, the lifting mechanism is tiltably mounted in a chip removal pit. In its uplifting working position a cover of the lifting mechanism substantially closes the chip pit except for the wheel carriers. In the recessed position of the lifting mechanism the cover tilts along with the lifting mechanism thereby guiding any chips accumulated on the cover onto a chip removing conveyor in the pit. For this purpose the lifting mechanism has a movable frame hinged to a stationary frame so that the hinging axis extends outside of a lifting plane passing through the rotational axis of the wheel set.

17 Claims, 3 Drawing Sheets

LIFTING MECHANISM ESPECIALLY FOR A WHEEL SET IN A TRUING MACHINE

FIELD OF THE INVENTION

The invention relates to a lifting mechanism, especially for a wheel set in a truing machine. The lifting mechanism includes carrier means for the wheel set and drive means for causing a vertical movement of the carrier means and wheel set.

DESCRIPTION OF THE PRIOR ART

German Patent Publications Nos. (DE-AS) 1,087,429 and (DE-OS) 2,621,050 describe lifting mechanisms of the above type. The function of these lifting mechanisms is quite satisfactory for lifting wheel sets, for example, in wheel truing machines in which the wheel set must be lifted to a level defined by dead center tips of the truing machine where the wheel set is taken over by the truing machine. The operation of such truing machines entails the production of substantial quantities of chips or cuttings which must be transported away. It has been found that the conventional lifting mechanism interferes with the falling of the chips or cuttings and also interferes with the construction of a chip collecting pit below the zone where the chips are falling down by gravity. The lifting mechanism also interferes with an automatic chip removal conveyor to be located below such a lifting mechanism.

OBJECTS OF THE INVENTION

In view of the foregoing it is the aim of the invention to achieve the following objects singly or in combination:

to construct a lifting mechanism of the type described which does not interfere with the free falling of the chips or cuttings during the operation of the truing machine;

to construct the lifting mechanism in such a way that it permits the construction of a chip pit including a chip remover or conveyor and which can guide the chips onto the conveyor; and to integrate the lifting mechanism in such a way with the truing machine that a cover plate covers an opening in the truing machine when the lifting mechanism is tilted out of the way and that in its raised positon the lifting mechanism cooperates with the opening, whereby the cover plate also functions as a chip guide.

SUMMARY OF THE INVENTION

The lifting mechanism according to the invention is characterized in that the carrier means for the wheel set are secured to a movable lifting frame which in turn is tiltably mounted to a stationary frame by a journal shaft. The stationary frame may be part of a machine base. The journal shaft is located outside of a lifting plane in which the wheel set axis extends. Thus, the movable lifting frame can be tilted into a recess and out of the way of the chip removal. The recess may simultaneously be the chip pit. The tilting motion of the lifting frame makes it possible to move the lifting frame at least out of a substantial portion of the cross-section of the chip pit. As a result, the lifting mechanism does not interfere any more with the free fall of the chips or cuttings, nor with the arrangement of a chip removal conveyor in the chip pit. By arranging the tilting shaft of the lifting frame horizontally it is possible to tilt the lifting mechanism downwardly. Additionally, the downward tilting permits an altogether simplified construction of the lifting mechanism.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

In the example embodiment described herein the present lifting mechanism 1 is combined with a wheel truing machine 20 of which only those portions are shown which are necessary for illustrating the combination. The truing machine 20 may be of the so-called portal type which makes it possible that a wheel set to be trued may roll into the portal truing machine on one side and roll out of the machine on the other side, whereby the wheel set retains its moving direction. It is also possible that a wheel set to be trued may roll into the machine in one direction and may roll out of it in the opposite direction.

Figure 3:
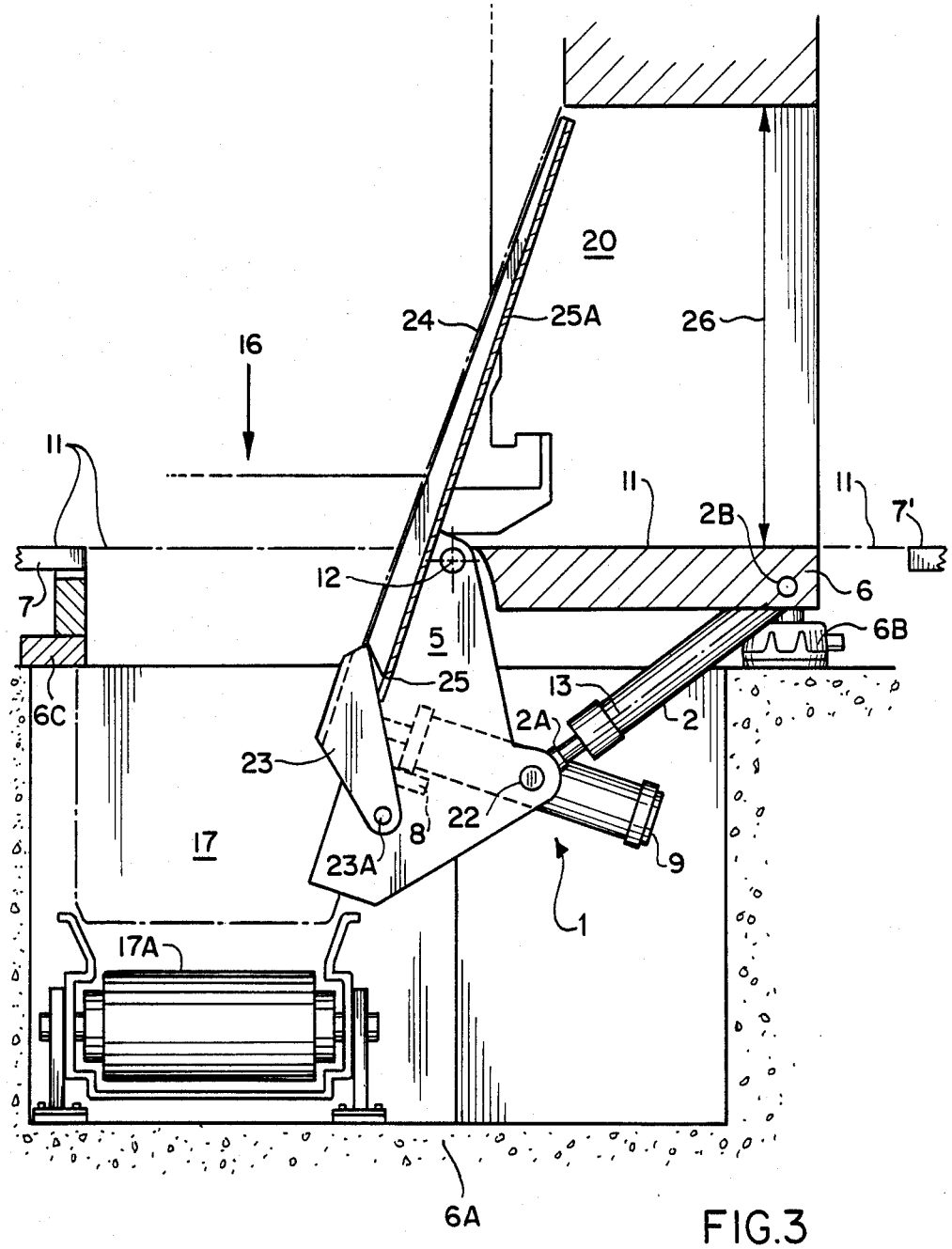
FIG. 3 is a view in the same direction as FIG. 1, but showing the lifting mechanism tilted into a downward, recessed position.

The truing machine 20 is located between a lead-in rail track 7 and a lead-out rail track 7'. A main support 6, formed as a machine base, is located between and below the two track sections 7 and 7'. The base 6 is supported on a foundation 6A by support bearings 6B and 6C, please see FIG. 3. The lead-in track 7 reaches all the way to a point just above a chip pit 17 located below the working range of the tool 20A of the truing machine 20. Thus, chips or shavings produced by the operation of the tool 20A can fall into the chip pit 17. A chip conveyor 17A is conventionally mounted in the bottom of the chip pit 17 for receiving the chips on its upper run to transport the chips out of the chip pit 17, as shown in FIG. 3. The track and base 6 are provided with an opening 16 leading into the chip pit 17 so that the chips can be guided onto the conveyor 17A when the lifting mechanism 1 is in its recessed position of FIG. 3 as will be described in more detail below. The base 6 forms a stationary frame for the present lifting mechanism 1 and may be part of the truing machine 20 or not.

The present lifting mechanism 1 comprises a first movable or tiltable frame formed by two lateral walls 4 and 5 rigidly interconnected by a cross-beam 8. The spacing between the two lateral walls 4 and 5 is preferably determined by the spacing between the rails forming the track 7, 7'. The walls 4, 5 extend in parallel to each other and in parallel to the track 7, 7'. A first power drive 9 such as a piston cylinder device is rigidly mounted to the movable frame, preferably to the cross-beam 8 so that the piston rod 9A or rather its central axis 15, extends vertically in a lifting plane. The lifting plane coincides with the sheet of the drawing in FIG. 2 and extends perpendicularly to the sheet of the drawing in FIGS. 1 and 3. The lifting plane is defined by the rotational axis 18A of the wheel set axle 14 and by the vertical longitudinal axis 15 of the piston rod 9A. Both axes 18A and 15 extend entirely in the lifting plane. The upper end of the piston rod 9A has rigidly secured thereto a wheel carrier member 10 provided with wheel carrying or supporting rollers 10A and 10B for supporting the wheels 21 of a wheel set having the above mentioned axle 14 with axle stubs 18 that may be received between the dead-center tips 19 of mounting arbors 20B of the truing machine 20.

Figure 1:
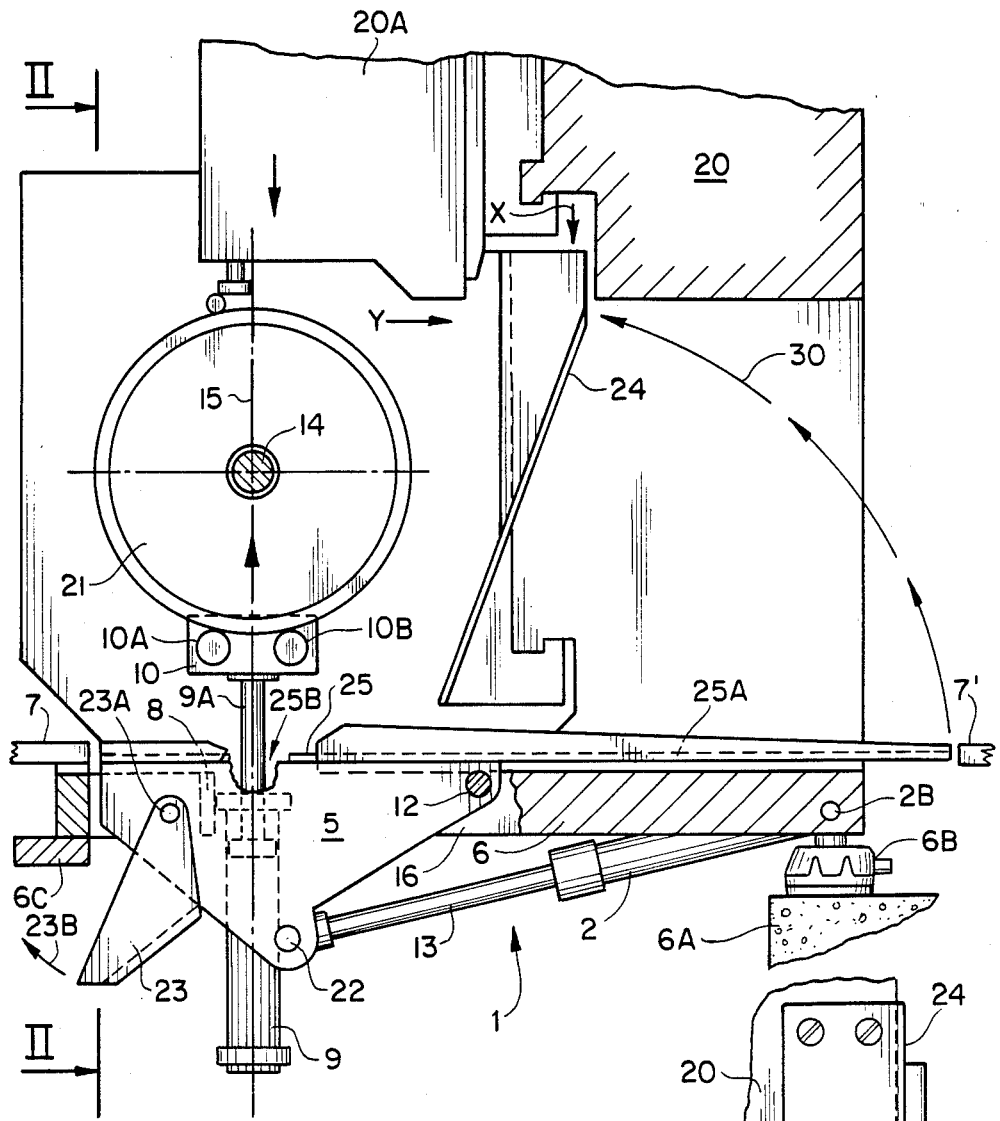
FIG. 1 is a side view of the present apparatus partially in section and substantially along the sectional plane I—I in FIG. 2, and showing the lifting position.
Figure 1A:
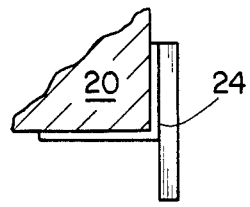
FIG. 1A is a view in the direction of the arrow X in FIG. 1 for showing the attachment of a stop frame to the machine frame.
Figure 1B:
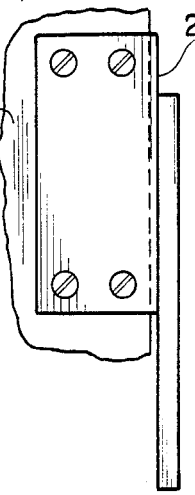
FIG. 1B is a view in the direction of the arrow Y in FIG. 1 for showing that the stop frame extends below its mounting bracket.
Figure 2:
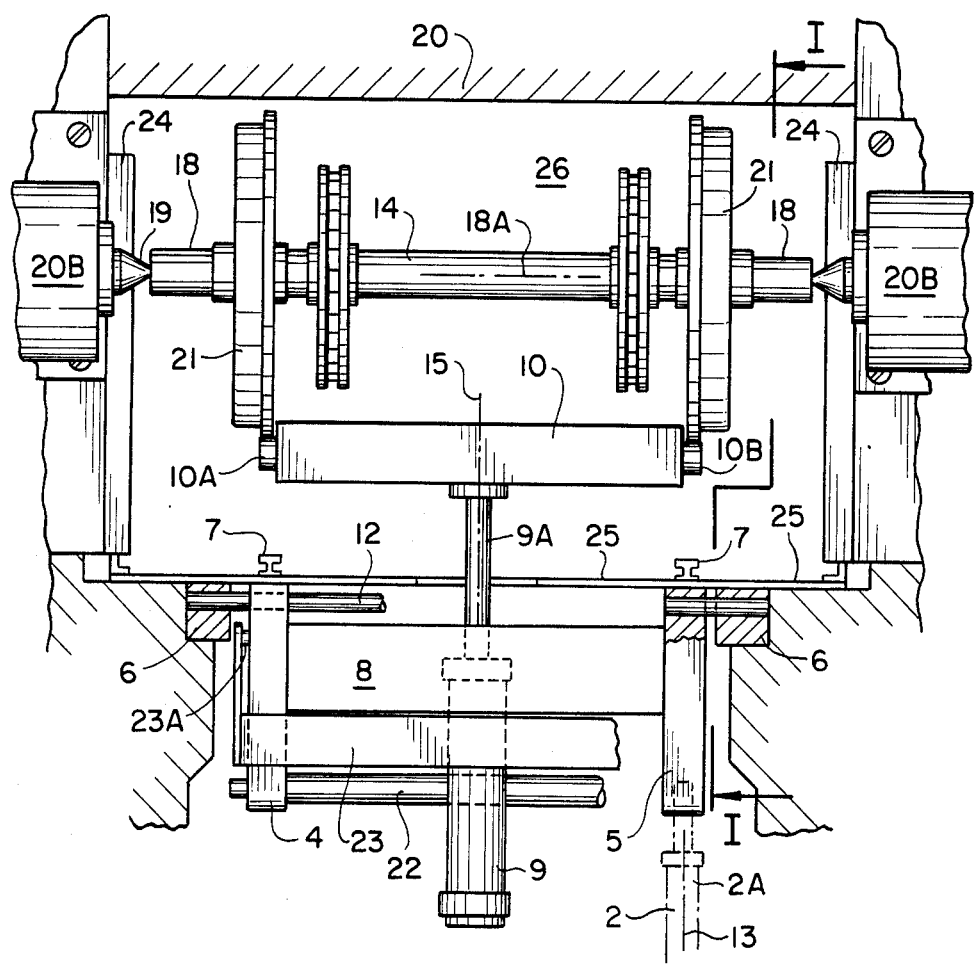
FIG. 2 is a front view partially broken away and partially in section substantially along section line II—II in FIG. 1.

When the wheel set 14, 21 has been lifted into the machining position shown in FIG. 1, the lifting mechanism 1 is in a position shown in FIG. 1. However, first the piston rod 9A is lowered to a level such that the wheel carrier member 10 with its rollers 10A 10B is approximately at a horizontal 11 defined by the rails or track 7, 7'. The wheel set is then rolled onto the wheel carrier elements 10, 10A, 10B and the piston cylinder device 9 is energized by a source of power, such as a hydraulic pump not shown, for lifting the wheel set as illustrated in FIG. 1. The lifting is continued until the rotational axis 18A coincides with the axis defined by the dead-center tips 19. Removal of the wheel set from the wheel carrier elements 10A, 10B operates in the reverse manner. The lifting and lowering operation of the power drive means 9 may be manually controlled or it may be controlled automatically in response, for example, to conventional control signals obtrained by sensors and/or stop means.

The movable frame 4, 5, 8 is equipped with a cover plate 25 provided with an extension 25A and an aperture 25B through which the piston rod 9A with the wheel carrier means 10, 10A, 10B extends in the lifting position as shown in FIG. 1, and through which the piston rod 9A with its wheel carrier means may be withdrawn into a recessed position shown in FIG. 3. The aperture 25B also permits some of the chips to fall downwardly when the lifting mechanism 1 is in the position shown in FIG. 1. When the cover plate 25 with its extension 25A is in the position shown in FIG. 3, the cover plate guides any chips accumulated on the cover plate onto the top run of the chip removal conveyor 17A located in the chip collecting pit 17 as shown in FIG. 3.

According to the invention the movable frame 4, 5, 8 with its cover plate 25 is hinged by a journal axis 12 to the stationary base or frame 6, whereby the entire unit can be tilted back and forth as indicated by the arrow 30 in FIG. 1. This movement is accomplished with the aid of second power drive means 2, such as a piston cylinder device having a piston rod 2A secured with its free end in a pivotal manner to the frame 4, 5, 8. For example, the free end of the piston rod 2A may be connected to a journal axis 22 which in turn is hinged to the side walls 4 and 5 of the movable frame. The other end of the piston cylinder device is secured in a hinging or pivotal manner to a fixed point such as the hinging axis 2B in the base 6. In FIG. 1 the piston rod 2A is fully extended to keep the lifting mechanism 1 in the operating uplifted fixed position, whereby the first mentioned piston cylinder device 9 can lift the wheel carrier elements 10, 10A, 10B independently of any lifting movement of said movable frame 4, 5, 8. In FIG. 3 the piston rod 2A is pulled into the respective cylinder to hold the movable frame of the lifting mechanism 1 in the recessed position inside the chip pit 17. The device 2 is so located that its axis 13 does not cross the journal axis 12 in any position of the device 2, please see FIGS.1 and 3. As mentioned, the base 6 may perform two functions, namely to provide a stationary frame for the lifting mechanism and a base for the truing machine 20.

Where it is intended to construct the lifting mechanism independently of the machine base 6, the lower portion of the base 6 shown in section would become a separate frame member of the lifting mechanism. In both embodiments the journal axis 12 would be located as shown, especially in FIGS. 1 and 3 slightly below the rolling plane 11. In any event, the opening 16 in the frame or base 6 would be arranged vertically above the pit 17.

The cover plate 25 and especially its extension 25A closes the rolling through passage 26 in the truing machine 20 when the plate or cover 25 is in the position of FIG. 3. A stop frame 24 attached around the edges of the passage 26 or at least along the lateral edges thereof, cooperates with the extension 25A of the cover 25 in that it provides a stop against further counterclockwise movement of the extension 25A and in that it covers a gap between the edges of the extension 25A and the machine part defining the passage 26.

A cover device 23 for covering the hole 25B in the plate 25 is hinged to the side walls 4 and 5 of the movable frame by journal axes 23A. FIG. 1 shows the cover device 23 in the withdrawn position so as to leave the hole 25B open. The cover device 23 is movable clockwise as indicated by the arrow 23B, for example, manually, into the aperture closing position shown in FIG. 3. Rather than operating the cover device 23 manually, it is also possible to provide some automatic operating mechanism such as a piston cylinder device operated simultaneously with the second power drive 2.

Since the extension 25A of the cover 25 reaches through the passageway 26 it is assured that chips cannot come to rest on the top of the base 6 and that the chips are then properly guided by the cover plate 25 with its extension 25A into the pit 17 when the lifting mechanism assumes the position shown in FIG. 3.

By arranging the tilting or journal shaft 12 in parallel to the axis 18A defined by the dead-centertips of the measuring or truing machine 20, it is easy to tilt the lifting mechanism 1 downwardly into the recessed position shown in FIG. 3, whereby the opening 16 into the chip pit 17 may have an advantageous position directly above the chip removal conveyor. Additionally, the base 6 of the truing machine 20 may thus become the stationary mounting frame for the lifting mechanism 1 so that separate mounting means are avoided.

As mentioned, the tilting axis 12 of the lifting mechanism 1 is located just slightly below the rolling level 11 defined by the tracks 7, 7' as best seen in FIG. 3, and in parallel to the front edge of the base 6. With this position of the axis 12 the complete tilting of the lifting mechanism 1 downwardly is facilitated and the guide plate 25 takes up the required position for leading any chips onto the conveyor 17A when it tilts upwardly.

The rigid interconnection of two lateral side walls 4, 5 by a cross-beam 8 makes it easy to conform the size of the lifting mechanism to the size of any chip pit by properly selecting the size of the walls and cross-beam so that the installation in the opening of the track 7, 7' into the chip pit 17 is facilitated.

Similarly, by journalling at least one tilting drive 2 to at least one of the lateral walls 4 or 5, and pivoting the other end of the tilting drive 2 to a fixed point 2B, the construction of the lifting mechanism becomes very simple and the lifting mechanism can be brought into the tilted away position or back into the working position without interfering with the truing machine 20.

Although the example embodiment shows the lifting mechanism connected to the base 6 of the truing machine, it is to be understood that the lifting mechanism can also be supported in its own bearing and thus function independently of other machines or structures.

Where the present lifting mechanism is integrated into a truing machine, the base 6 of the truing machine 20 can be constructed as a stationary frame to which the lifting mechanism is attached as described, whereby the frame can be inserted into an opening of for example, the chip pit. However, such a frame may itself be part of the lifting mechanism and not part of the truing machine as described. In both instances a complete support for the lifting mechanism is provided by the mentioned stationary frame 6.

The above mentioned stop frame 24 is preferably arranged in the truing machine so that it can cooperate with the cover extension 25A in its tilted position shown in FIG. 1 to guide chips onto the extension 25A when the latter is in its horizontal position, and so that gaps between the extension 25A and the rolling through passage 26 through the truing machine 20 are closed when the cover plate is in its upwardly tilted position shown in FIG. 3.

An advantage of the above mentioned cover 23 for the wheel carrier elements 10 in their recessed position is seen in that the cover 23 keeps chips out of the lifting mechanism 1 when the chips slide down the plate 25.

The cover mechanism 23 is preferably tiltably mounted in such a position so that it may be operated manually or by a tilting device such as a pneumatic piston cylinder device not shown. Further, the access to the lifting mechanism 1 itself is facilitated by simply tilting the cover mechanism 23 out of the way.

Although the invention has been described with reference to specific example embodiments, it will be appreciated that it is intended to cover all modifications and equivalents within the scope of the appended claims.

What we claim is:

1. A lifting apparatus for lifting a wheel set having a rotational axis, into a defined position, comprising a machine frame including a journal support (6), first power drive means (9) including wheel set carrier means (10A, 19B) for directly and vertically lifting said wheel set (21) in a vertical lifting plane, first movable frame means (4,5,8) operatively supporting said first power drive means in said machine frame, first journal means (12) having a first journal axis for hinging said first movable frame means (4,5,8) to said journal support in said machine frame in such a position that said first movable frame means and said first drive means can be tilted between operative and recessed positions, said first journal axis (12) being positioned outside said vertical lifting plane (15) passing through said rotational wheel set axis (14) which extends within said vertical lifting plane (15), whereby said first power drive means can be tilted out of the way of a downward chip path, said apparatus further comprising second drive means connected to said first movable frame means (4, 5, 8) and to a fixed point for moving said first movable frame means about said first journal axis back and forth between said operative and recessed positions.

2. The apparatus of claim 1, wherein said second drive means (2) are power drive means journalled to said first movable frame means (4, 5, 8) and to said fixed point (2B).

3. The apparatus of claim 2, wherein said first journal axis (12) is arranged horizontally.

4. The apparatus of claim 1, wherein said first journal axis (12) is arranged in parallel to said wheel set axis (14) which coincides with a measuring axis defined by deadcenter tips (19) of a measuring or machining apparatus arranged for cooperation with said lifting apparatus.

5. The apparatus of claim 1, wherein said first journal axis (12) is arranged below a rolling plane (11) along which said wheel set can roll.

6. The apparatus of claim 1, wherein said movable frame means comprise at least two side walls (4, 5) arranged opposite each other and in parallel to each other, and cross-beam means (8) interconnecting said side walls, said first power drive means being connected to said cross-beam means, said first power drive means comprising wheel carrier means (10) for supporting said wheel set when said first power drive means lift said wheel set.

7. The apparatus of claim 6, wherein at least one of said side walls is pivotally connected with said second power drive means for tilting said first movable frame means.

8. The apparatus of claim 7, wherein said second drive means comprises a fluid operated piston cylinder device (2) one end of which is pivotally connected with at least one of said side walls and the other end of which is pivotally connected to said fixed point, said piston cylinder device being located in such a position that an intersection between a longitudinal axis (13) of said piston cylinder device and said first journal axis (12) is avoided in any desired tilted position of said side walls (4, 5).

9. The apparatus of claim 1, wherein said machine frame comprises a stationary frame member (6) having an opening (16) therein for said first movable frame means, said first journal means (12) hinging said first movable frame means to said second stationary frame member for providing said journal support.

10. The apparatus of claim 9, wherein said second stationary frame means comprises a main support (16) for supporting said first journal axis (12) and for forming said fixed point.

11. The apparatus of claim 1, wherein said first movable frame means comprise a cover plate (25) arranged for covering said opening at least in said first movable frame means, said cover plate having an aperture (25B) therein through which said first power drive means extend for lifting said wheel set.

12. The apparatus of claim 11, wherein said cover plate (25) comprises an extension (25A) projecting outside of said first journal axis (12) to such an extent that a rolling-through passage (26) for said wheel set arranged in a machining apparatus (20), is closed by said cover plate extension when said lifting apparatus is in said recessed position.

13. The apparatus of claim 12, further comprising a stop frame (24) surrounding said rolling-through passage (26) at least partially, said cover plate extension bearing against said stop frame (24) when said lifting apparatus is in said recessed position.

14. The apparatus of claim 1, further comprising wheel carrier means (10) connected to said first power drive means (9) and movable covering means (23) secured to said first movable frame means for covering said wheel carrier means (10) in its recessed position.

15. The apparatus of claim 14, wherein said movable covering means (23) comprise journal means (23A) tiltably securing said covering means (23) to said first movable frame means for moving said covering means between a covering position when said wheel carrier means of said first power drive means are in said recessed position, and a withdrawn position when said wheel carrier means of said first power drive means are in said operative wheel lifting position.

16. The apparatus of claim 1, further comprising a chip pit of a wheel truing machine, said chip pit being located below said machine frame so that said vertical plane passes through said chip pit for passing machining chips into said chip pit when said first movable frame means with said first power drive means are in said recessed position at least partly in said chip pit.

17. The apparatus of claim 1, wherein said first power drive means (9, 9A) move said wheel set carrier means (10A, 10B) independently of any lifting movement of said first movable frame means (4, 5, 8).

* * * * *

UNITED STATES PATENT AND TRADEMARK OFFICE
CERTIFICATE OF CORRECTION

PATENT NO. : 4,825,737

DATED : May 2, 1989

INVENTOR(S) : Alfred Heimann, Herbert Ligacz

It is certified that error appears in the above-identified patent and that said Letters Patent is hereby corrected as shown below:

Claim 1, (Column 5, line 54) replace "(10A, 19B) by --(10A, 10B)--.

Claim 7, (Column 6, line 31) replace "power drive means" by --drive means--.

Signed and Sealed this

Fifteenth Day of May, 1990

Attest:

HARRY F. MANBECK, JR.

Attesting Officer    Commissioner of Patents and Trademarks